July 5, 1966  A. R. BUTTON  3,258,886

TILTABLE VEHICLE SHELTER

Filed April 10, 1963

INVENTOR.
A. Russell Button
BY
Dale A. Winnie
ATTORNEY

United States Patent Office 3,258,886
Patented July 5, 1966

3,258,886
TILTABLE VEHICLE SHELTER
Aaron Russell Button, 44109 Grand River, Novi, Mich.
Filed Apr. 10, 1963, Ser. No. 272,032
3 Claims. (Cl. 52—64)

This invention relates to garage enclosures generally and more particularly to semi-portable shelters for automotive vehicles and the like.

Most garage enclosures for automotive vehicles are much larger than is necessary for mere shelter purposes. This is due in part to the need for reasonable side clearance in driving a car into the conventional garage or shelter as well as to afford access for motorists entering and leaving a car housed in the enclosure.

Although many of today's cars have a lower profile, people are accustomed to entering a car from an erect standing position and while some cars may be more narrow than others, the outwardly swinging doors of the vehicle still must be accommodated.

Practically all acceptable shelters for automotive vehicles are fixed and permanent structures. Normally they are provided at the motorist's residence where they accumulate bicycles and wagons during the day while the family car sits in a downtown parking lot and are unused at night due to the inconvenience of clearing a space away for access. Very few auto owners can afford the luxury of a garage near work and at home.

Many new car owners have tried to use some form of car cover to protect their bright and shiny new possession against the hot sun, salt air or whatever the adverse weather condition. However, most portable covers are more trouble than value and are soon discarded. At best they protect windshields and window areas from ice and snow but, even then, at considerable inconvenience as regards removal and storage.

The ideal protective shelter for an automotive vehicle need be little larger than the vehicle itself; provided means are afforded for getting the car into the enclosure and reasonable means of ingress and egress is available to the auto owner and his passengers. To this end, inverted bowl and open-bottom structures have been proposed and offered in various forms whereby they are either totally raised, tilted or rocked open for access thereunder.

This type of vehicle shelter has many advantages. It requires very little space, is purely functional, and may be conveniently relocated if desired. It will hold the heat of the car in winter months for easier starting as well as traveling comfort. Maintenance costs are minimal on the housing itself due to its small size. Enclosures for parking lot spaces would be practical due to the smal space required, and numerous other advantages come to mind.

Unfortunately, this type of structure has not received general acceptance. The reasons seem to be that the operating mechanism has been too complicated and costly, and that the problems of adequate support for the elevated housing, against high winds in particular, have introduced obstructions precluding ease of entry and exit for the car and the motorists. Usually a support is disposed so near a car door that it cannot be fully opened, if at all. In addition, the structures have been either too light, for lifting ease, making them susceptible to high winds when raised up, or too heavy and cumbersome to counteract this problem but making them more difficult to manipulate.

It is an object of this invention to provide an open-bottomed garage-type shelter for vehicles which is more practical and acceptable than those heretofore offered to the general public.

It is an object of this invention to provide an inverted type housing for vehicles which includes a lightweight plywood, fiberglass, aluminum or like shell which is tilted to an open position and is counterbalanced to enable manual operation.

It is an object of this invention to provide a vehicle shelter of the type mentioned which is both tilted up and retracted to afford easier access for the car and its driver and passengers.

The vehicle shelter or enclosure of this invention includes operative crank arms which serve to both raise the housing to an open tilted position and to move it backwards so that there is no side obstruction for either the car or the motorists.

Other objects of this invention include providing a car shelter which is simple in construction and compact in arrangement for lower cost in manufacture, assembly, shipment, installation and maintenance. This also assures easier relocation, if and when desired, and simplicity of operation for any member of the household.

These and other objects and advantages to be gained in the practice of this invention will be better understood and appreciated upon a reading of the following specification in regard to a preferred embodiment of the invention and having reference to the accompanying drawings wherein.

Figure 1:
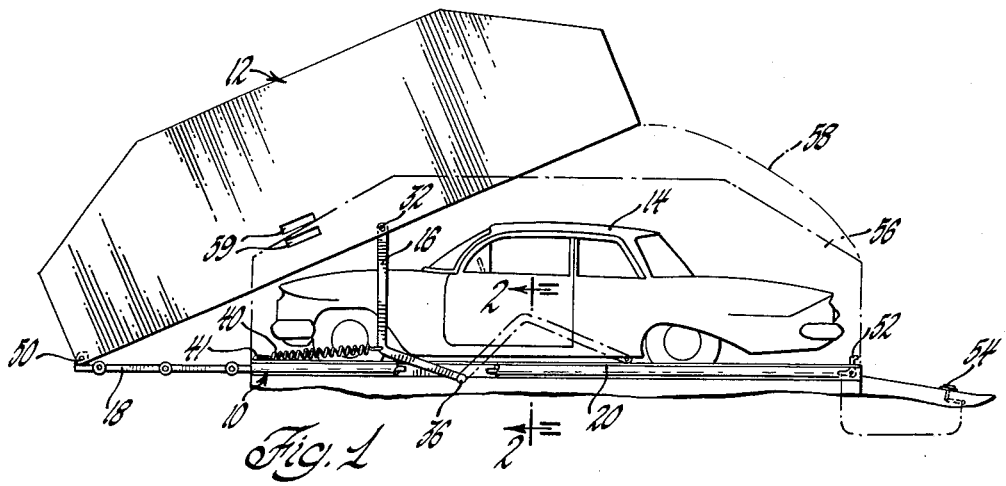
FIGURE 1 is a side view of the garage-type shelter of this invention shown as elevated and retracted and with a vehicle disposed thereunder.
Figure 2:
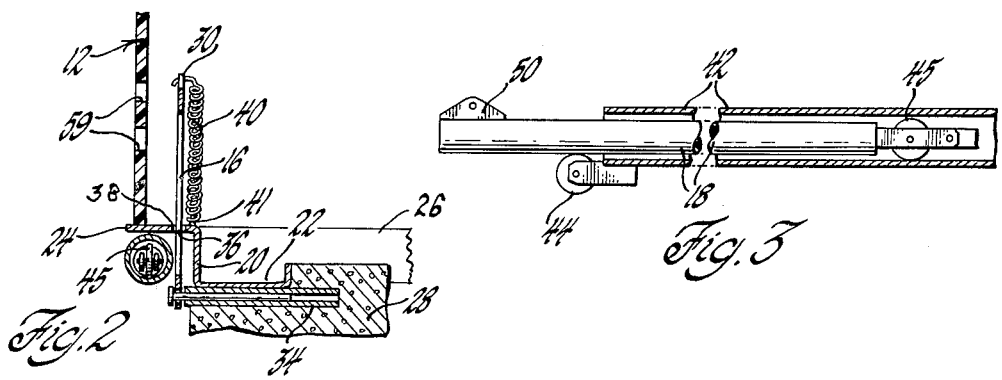
FIGURE 2 is an enlarged and cross-sectional view of an operative part of the shelter operating mechanism as seen in the plane of line 2—2 in FIGURE 1.

Referring to the drawings in further detail:

The vehicle shelter of this invention preferably includes a floor or base portion 10 over which is disposed an open bottomed housing 12 which is attached to the base and is tiltable about one end to receive a vehicle 14 under the other end thereof. The pivotal movement of the housing 12 is controlled by lever arms 16 and reciprocal movement afforded the housing is controlled by horizontally disposed guide rail members 18 which have one end of the housing pivotally secured thereto.

The base 10 is essentially a framework defining the space within which the vehicle 14 is to be disposed to be covered by the housing 12. It includes side frame rails 20 which are disposed in parallel spaced relation. They have a shallow channel portion 22 extending the full length of the rails and upwardly open to receive and guide the wheels of a car driven therebetween. They serve essentially to guide the car into the space over which the housing 12 is operable and may include such stops as are necessary to position the car longitudinally thereof.

The side frame rails 20 each include an outwardly disposed flange 24 on which the side walls of the housing 12 are received when the vehicle covering is positioned down thereover. The housing side walls are intended to be received near the outer edges of the side rail flanges 24 to preclude any buildup of ice or snow therebetween. The flange is conveniently disposed to serve as a step for persons entering a vehicle within the shelter space.

The frame side rails may be interconnected by cross rails, as 26, at the ends if desired. The frame side and cross rails may be bolted or welded together or, if preferred, side rails alone may be used with lag bolts for anchoring the rails on a poured concrete base, retaining foundation or the like. In the present instance a poured concrete base 28 is shown. It will be appreciated that while this provides a more permanent installation, the base frame if only bolted to the slab provides an installation which is still semi-portable.

Although not specifically shown, it will be appreciated that the side frame rails 20 may be poured or pre-stressed concrete beams anchored to a slab 28 or merely set on the ground and retained in parallel spaced relation by suitable cross braces or other means. In such case the operative mechanism associated therewith, and yet to be described, would be embedded in the beams.

The housing 12 is of one-piece construction and is preferably made of glass fibers or like material. The housing cover is waterproof, dustproof, fire resistant, relatively lightweight and essentially maintenance free. It is essentially an inverted bowl; being closed at the top, ends and sides with the only opening provided at the bottom thereof. It may be contoured to the general shape of the vehicle to be received thereunder; at least to the extent shown. The width and length of the housing is complementary to the base 10 or, actually, the base is sized to the housing width and length. The arrangement is such that the housing will be received and rest on the flanges 24 of the side rails and overlap or otherwise close on the frame at the ends.

The lever arms 16 are pivotally connected to the side rails 20 and the housing 12. They are formed as crank arms with an offset 30 provided between the ends thereof. As will be subsequently appreciated, the offset 30 affords additional clearance, when the levers are erected, for opening vehicle doors and assuring easier access to and from a vehicle disposed under the housing cover 12.

The lever arms have a fixed pivotal connection 32 to the housing. A tubular cross brace 34 may be used between the side frame rails and as a journal for pivot pins 36 which provide a fixed axis for the other ends of the levers. The frame side rails have the flanges 24 slotted as at 38 to receive the lever arms therethrough.

Coil springs 40 are connected to the ends of the side frame rails 20, as at 41 and to the lever arm offset 30. The springs serve to counterbalance the weight of the housing 12 and assist in the actuation of the lever arms 16 in tilting the housing to an open position.

Figure 3:
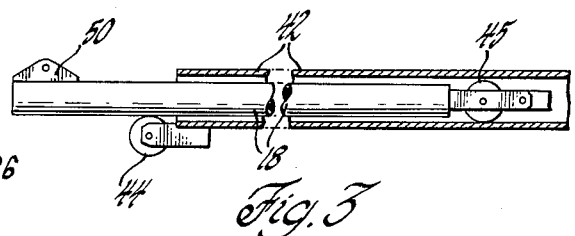
FIGURE 3 is a further enlarged and cross-sectional view of a part of the operative mechanism.
Figure 4:
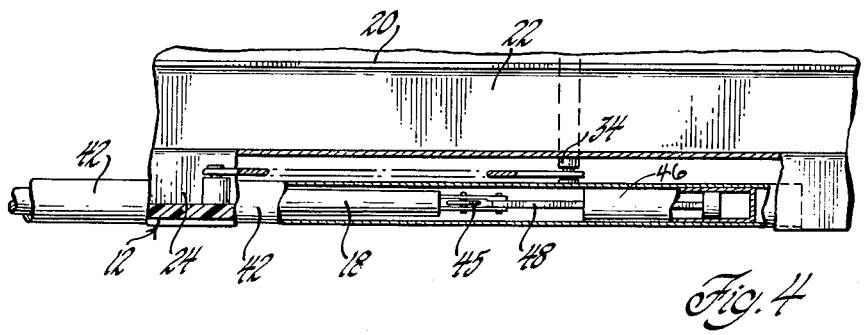
FIGURE 4 is a top plan view of a part of the operative mechanism with parts broken away and shown in cross section for a better understanding thereof.

The horizontally reciprocal guide rails 18 are telescopically provided within a guiding tube or pipe 42 which is mounted on the underside of the rail flanges 24. The guide rails are extendible beyond the ends of the frame. They are shown to include roller wheels 44 and 45 which are provided on respectively opposite ends of the telescopic members as shown by FIGURE 3 to afford greater reciprocation ease therebetween.

A piston cylinder 46 may be used as a damper and for such purpose has the piston rod 48 connected to the ends of the guide rails 18.

One end of the housing 12 is pivotally secured to the end of the reciprocal guide rails 18, as at 50.

A catch 52 is provided at the end of the housing which is opened and it is interconnected to some mechanical or electrical trigger means 54 whereby the catch can be released automatically and, with proper counterbalancing, the housing can be raised and positioned to receive a vehicle thereunder.

The vehicle shelter of this invention is used in the following manner:

When the car 14 first approaches the shelter the housing 12 is disposed on the side rails in the dotted line position 56. When the car passes over the trigger means 54, the catch 52 is released and the springs 40 pull on the lever arms 16 to lift the front end of the housing 12 upwardly and pull the whole housing back so that the lower front edge follows the dotted line 58 to the full line position shown in FIGURE 1.

The car is driven onto the floor or base 10 and is guided by the side rails 20 to the vehicle position shown.

It will be noted that the offset 30 in the lever arms 60 clears the car doors so that they may be fully opened. Further, the housing 12 need be raised only to car height or as necessary to provide standing clearance and good access to the vehicle doors. The housing need not have the opening end lifted unduly high and where it is subject to high winds. Furthermore, since the housing is moved back at the same time it is tilted to an open position, the lever arm 16 affords a brace which engages the housing midway between its ends and assures greater support and stability therefor.

As the lever arm 16 raises the housing 12 to the tilted position shown, the reciprocal guides 18 retract the housing in a rearward direction and in large part removed from over the car space so that access is easier for the car and motorist entering and leaving the same.

The housing 12 may be manually lowered to enclose, cover and protect the car 14 once disposed thereunder. The operation is much like closing a garage door.

Hand holes 58 may be provided within the side walls of the housing; these may also serve to receive a chain and lock therethrough and around the lever arms if such theft proof protection is required. The hand holes may have closure flaps (not shown) if desired.

It will be appreciated that the reverse operation is followed to raise the housing 12 and to remove the car 14 from thereunder.

It should also be appreciated that either the springs 40 or piston cylinder dampers 46 might be replaced with power actuators.

Figure 5:
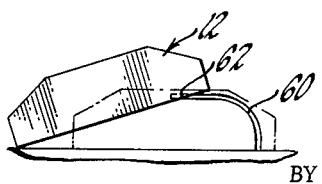

FIGURE 5 diagrammatically illustrates a form of this invention which makes use of vertically disposed and rearwardly curved guide rails 60 which would be provided at the front end of the shelter base and would be formed to receive followers 62 provided on the front corners of the housing whereby they would be guided in the tracks to move the housing in the manner previously described. Counterbalanced lever arm operators of the type previously described, or other means, may be used as the operative mechanism. The back edge of the housing could include a simple guide roller arrangement or guide rails as previously described.

Figure 6:
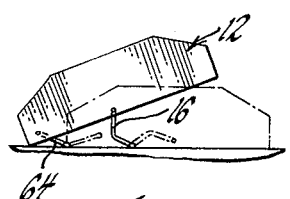
FIGURES 5 and 6 are diagrammatic illustrations of different variations of the present invention.

FIGURE 6 diagrammatically shows another embodiment whereby a second lever arm 64 is interconnected between the side rails and the housing near the rearwardly disposed end thereof to lift and set over the back edge. This would afford essentially the same movement for the front bottom edge of the housing as previously described and might have the additional advantage of a vertical lift and set down to break any ice forming about the bottom of the housing when seated on the side rails.

Although a preferred embodiment of this invention has been shown and described in detail, with certain modifications and improvements briefly mentioned, it will be appreciated that other modifications and improvements are within the scope of the teachings set forth. Accordingly, such of these improvements and modifications as are within the spirit of the invention and are not specifically excluded by the language of the hereinafter appended claims, are to be considered as inclusive thereunder.

I claim:

1. A vehicle shelter, comprising:
    a vehicle space defining frame including a pair of side rails disposed in parallel spaced relation for receiving and guiding a vehicle therebetween, an open-bottomed housing mounted on said frame and tiltable about one end to an open position receptive of a vehicle under the other end thereof,
    lever arms pivotally connected to said side rails and to said housing on opposite sides and between the ends thereof,
    horizontally reciprocal means provided on said space defining frame and having said one housing end pivotally secured thereto, said reciprocal means being extendible outwardly from one end of said space defining frame, and housing counterbalancing means connected between the ends of said side rails and said lever arms for pivotal actuation of said lever arms and synchronous lifting and retracting of said housing permissive of vehicle entry within said space defining frame for subsequent enclosure under said housing.

2. The vehicle shelter of claim 1, said counterbalancing means including helix wound springs connected between the ends of said side rails and said lever arms in tension.

3. The vehicle shelter of claim 2, said lever arms being bell crank in shape and having the counterbalancing spring means connected to the apex thereof for overcenter holding as well as pivotal actuation thereof.

References Cited by the Examiner

UNITED STATES PATENTS

| | | | |
|---|---|---|---|
| 2,740,997 | 4/1956 | Gipslis | 52—66 |
| 2,768,024 | 10/1956 | Spear | 268—74 |
| 3,009,211 | 11/1961 | Hansen | 52—66 |
| 3,017,721 | 1/1962 | Wasserman | 52—1 |
| 3,060,520 | 10/1962 | Schutmaat | 52—66 |

FOREIGN PATENTS

| | | |
|---|---|---|
| 1,059,849 | 1953 | France. |
| 1,165,267 | 1958 | France. |
| 826,792 | 1952 | Germany. |

FRANK L. ABBOTT, *Primary Examiner.*

JACOB L. NACKENOFF, *Examiner.*

J. E. MURTAGH, *Assistant Examiner.*